United States Patent Office 3,298,355
Patented Jan. 17, 1967

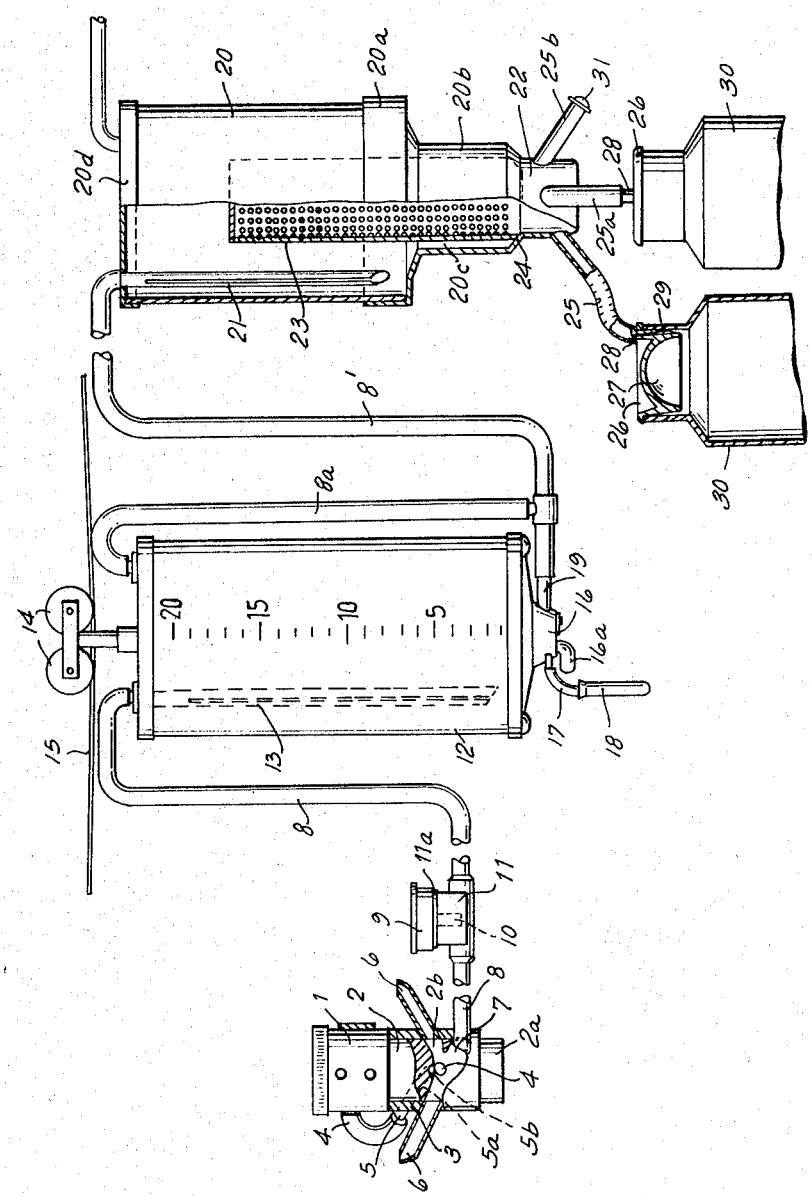

3,298,355
VACUUM OPERATED MILKING MACHINE
Klaus-Jürgen Karnath, 22 Sonnenbergerstrasse, Wiesbaden, Germany; Günther Karnath, 92 Hertingerstrasse, Unna, Germany; and Kurt Karnath, 22 Sonnenbergerstrasse, Wiesbaden, Germany
Original application Oct. 7, 1963, Ser. No. 314,562, now Patent No. 3,242,903, dated Mar. 29, 1966. Divided and this application Aug. 16, 1965, Ser. No. 480,200
Claims priority, application Germany, Oct. 5, 1962, K 47,899; Nov. 2, 1962, K 48,122; Dec. 12, 1962, K 48,444, K 48,445
3 Claims. (Cl. 119—14.46)

This is a division of application Serial No. 314,562, filed October 7, 1963, now Patent No. 3,242,903, issued March 29, 1966.

The present invention relates to milking apparatus.

As is well known, the supply of labor in agriculture is diminishing and there has long been a requirement for automatic machines to perform operations so that a minimum number of workers is required.

In the case of dairy operations in connection with the milking of cows, it has long been desired to make the operations as automatic as possible so that, for example, it is necessary only to attach the milking apparatus to the cow and remove it from the cow, so that in this way a relatively large number of cows can be taken care of by a single person with all of the milking operations performed by a single person for a relatively large number of cows. The situation is rendered rather complex because much more is involved than simply obtaining milk from the cows. It is necessary to measure the amount of milk received from each cow and it is also necessary to take test samples of milk, without interrupting the milking operations, and up to the present time there is no machine available which can perform all of these operations in an automatic and fully satisfactory manner.

One of the difficulties encountered is in connection with the filling of the final milk containers since, if they are filled simultaneously, it is necessary to judge quite accurately how much milk will be received so that the number of containers to be simultaneously filled can be chosen in such a way that they will all be filled at the end of the operation. Since it is next to impossible to accurately determine how much milk will be received, there is the necessity of interrupting the final operations by taking milk from one of a plurality of partly filled cans and distributing it among the others so as to obtain a number of completely filled cans.

It is accordingly a primary object of the present invention to provide a milking apparatus which is automatic to an extent far greater than has hitherto been the case so that in this way each individual worker can take care of a far greater number of cows and the extent of automatic operation is very greatly increased.

Another object of the present invention is to provide an apparatus of the above-mentioned type which operates on a constant-vacuum principle so that all containers and passages connected to the apparatus will be subject to constant suction—and therefore be free from milk residue at all times—during operation of the apparatus.

It is a more specific object of the present invention to provide a structure which is capable of automatically filling a series of cans in sequence so that the milk will flow to a given can only after it has completely filled the immediately preceding can, so that if there are too many cans, then those which are not required will simply remain empty and it will become unnecessary to redistribute the milk among the cans at the end of the operation.

With the above objects in view the invention includes, in a vacuum-operated milking apparatus having a passage means formed with milk and air passages and adapted to be connected to a cow for receiving milk from the cow, a conduit means communicating with the passage means for receiving the milk and air therefrom, and a measuring container means, a filter container means in which the milk is filtered before it is collected, and a distributing means for distributing the milk in sequence to a plurality of cans filling each can before flowing into the next can.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawing in which one possible embodiment of a structure according to the invention is illustrated schematically and partly in section.

Referring now to the drawing, the assembly shown at the left thereof forms the passage means of the invention which includes milk and air passages. There are four tubes 6, of which only two are visible in the drawing, and these tubes 6 are connected to hoses, respectively, which in turn are connected in a well-known manner to the teats of the udder of the cow, and when thus connected the assembly shown at the left of the drawing is simply suspended from the cow. This assembly includes the pulsator 1 of conventional construction. The passage means include an elongated cylindrical body 2 which is fixed to the bottom of the pulsator and extends downwardly therefrom. The cylindrical body 2 is formed with four bores 2b passing therethrough and respectively corresponding to and communicating with the four tubes 6. A collecting passage 7 is also formed in the body 2 and communicates with all of the passages 2b so that the milk flowing into these passages will collect and flow down through the passage 7. A conduit means 8 communicates with the passage 7 and includes a tubular portion which directly cooperates with the passage 7. In addition, the body 2 is formed with a passage 5a which communicates with the tubular extension 5 which is connected by a small hose element 4 to the pulsator, the pulsator exterior air passing through the tube 4 into the tube 5 and of course from the latter through the passage 5a, the latter also communicating with the collecting passage 7 as shown at 4' in the drawing.

The left tubular portion of the conduit means 8, the several tubes 6, and the tube 5 are all carried by a cylindrical sleeve 3 which is formed with openings from which the several tubes extend, and when mounted in the illustrated operative condition, these openings of sleeves 3 are respectively aligned with the several passages of the body 2 so that the several tubes will communicate with these passages in the manner described above. The sleeve 3 frictionally surrounds the cylindrical body 2 so that while it will by friction remain in its operative condition, nevertheless it is capable of slipping with respect to the body 2 when acted upon by a force which is sufficient to overcome the friction. With the passage means described above, the milk and air will of course be received in the conduit means to flow therealong away from the body 2. It is to be noted that the bottom end 2a of the body 2 extends downwardly beyond the sleeve 3 through a substantial distance. Should the assembly shown at the left of the drawing fall from the cow, then of course the extending portion 2a of the body 2 will strike the floor and this will provide an impact causing the body 2 and the pulsator to suddenly stop moving while the inertia of the sleeve 3 will continue the movement thereof overcoming the friction between the body 2 and the sleeve 3 so that the latter will automatically shift under these circumstances, and the frictional contact of the parts are so designed that if the passage means falls from the cow, the sleeve 3 will automatically shift along the body 2 by a distance sufficient to displace the several openings of the sleeve 3 beyond the several passages with which they are aligned so that the sleeve 3 will now automatically close all of these passages, and thus the apparatus will remain clean and the operations will not require an interruption for the purpose of extensive cleaning of the apparatus. It is to be noted that the passage 5a is of a smaller cross sectional area than the other passages and that the opening of the sleeve 3 which communicates with the tube 5 is smaller than the other openings, so that before the passages 2b and 7 are fully closed, the passage 5a will first be fully closed so that initially the pulsator is shut off from the rest of the apparatus and then immediately thereafter the passages 2b and 7 will be closed, so that all of the milking connections will be closed. In this way the apparatus cannot become unclean.

Directly in the region of the above-described structure is located a pressure indicating reducing valve 9 which is known installations is located in the region of the suction pump. The arrangement of the invention is however of considerable advantage since the assembly 9 will give an indication of the extent of vacuum in the immediate vicinity of the milking apparatus and suitable controls can be provided at this region where the controls are far more effective. The valve assembly 9 includes a downwardly directed frustoconical tubular extension 10 and the conduit means 8 has a rigid portion formed with an opening through which the tubular extension 10 extends in a manner providing a tight connection between the member 10 and the conduit means 8 so that in this simple way the instrument 9 is attached to the conduit means 8. At the lower wall of the instrument 9 a dish-like part of a sleeve of elastic plastic material is fixed as by being glued thereto, and this sleeve is provided with a pair of springy extensions 11 in the form of a pair of leaf springs which grip the conduit 8, the latter passing between and being gripped by these leaf springs 11 so that in this way the instrument 9 is supported on and connected to the conduit 8 in a fluid-tight manner.

The conduit means 8 terminates in an elongated tubular portion 13 located within a measuring container means 12. In order to avoid spraying and foaming of the milk, the bottom open end of the tubular portion 13 of the conduit means is located close to the bottom wall of the container means 12. In addition to its bottom open end the portion 13 is formed with at least one opening adjacent the top of the container means 12 so that, when the latter is filled to capacity with milk, constant vacuum connection will still be maintained with the conduit means 8 in a manner which will become more obvious presently. Preferably, the portion 13 is formed with openings over its entire height. The conduit means 8 extends fluid-tightly through an opening in the cover of the container means 12, this cover being fixed to the cylindrical portion of the container means so that the latter will hang from the cover and the cover itself is connected through suitable brackets to a pair of rollers 14 which are supported on a cable 15 so that the apparatus can very easily be moved from one operating position to the next operating position. The container means 12 has a transparent cylindrical wall provided with a scale so that the amount of milk received from each cow is readily observable.

The bottom wall of the container means 12 carries a two-way valve means 16 which has a pair of open positions as well as a closed position, and of course while the valve means 16 is closed, the milk will rise up in the container means 12 giving an indication of the amount of milk received from a particular cow. Thus, during the milking of a cow the valve means 16 will be maintained closed so that the amount of milk received from the cow can be determined. However, for a very small fraction of the time during which the milk flows into the container means 12 the handle 16a of the valve means 16 can be manipulated by the operator to place the valve means 16 in one of its open positions in which a very small amount of the milk will flow through the tube 17 into a test tube 18 so that a test sample can be obtained in this way without interrupting the automatic operations. When the milking of a given cow has been completed, the milk will have risen in the container means 12. However, by virtue of the fact that at least one opening in the portion 13 is located above the maximum fill-line of the container means 12, constant suction is still being maintained in the entire system, all the way to the teat cups. When, now, the milk accumulated in container means 12 is to be discharged, the handle 16a is manipulated to place the valve means 16 in the other of its open positions, and now the milk will flow out of the container 12 through a tube 19 which forms part of an additional conduit means 8', the milk now discharging from the container 12 through the additional conduit means 8'. The conduit 8a, which communicates both with the upper part of the container means 12 and with the conduit means 8', and which of course represents the operational connection of the container means 12 and the teat cups with the vacuum means, now also serves to equalize the pressure.

The milk will now flow through the additional conduit means 8' into an elongated tubular portion 21 which forms the end of the conduit means 8', this tubular portion 21 being fluid-tightly located within a filter container 20 closed by a cover 20d which is connected through the conduit indicated at the upper right portion of the drawing to a vacuum pump, this conduit communicating with the interior of the container 20 so that the interior of the container 20 is evacuated and of course the vacuum acts through the conduit means 8' on the measuring container means 12 and through the openings in portion 13 disposed in the container means 12 on the conduit means 8 so that in this way the mixture of milk and air is withdrawn from the passage means which is connected to the cow.

The bottom of the filter container 20 is connected to a stepped assembly which terminates in a lower collecting chamber means 22, the intermediate portion 20b between the collecting chamber 22 and the container 20 having a diameter larger than the connecting chamber 22 but smaller than the filter chamber 20, the bottom end portion 20a of the container 20 being connected to the intermediate portion 20b. On the junction 24 between the collecting chamber 22 and the container portion 20b rests a perforated cylindrical filter 23 surrounded with unillustrated wadding or the like, as is conventional, and the milk which reaches the container 23 through the tube 21 surrounds and is distributed over substantially the entire length of the filter 23 so that in this way a very large filter area is provided. The filter is of course open at its bottom end so that the filtered milk simply flows into the collecting chamber means 22.

As may be seen from the drawing, the tube 25 communicates with the collecting chamber 22 in order to direct milk therethrough to the left container 30 shown in section in the drawing, and then another tube 25a communicates with the collecting chamber 20 and is connected to the latter at an elevation higher than the tube 25, and a third tube 25b also communicates with the collecting chamber 20 and is connected thereto at an elevation which is higher than the connection of the tube 25a to the collecting chamber 22. Of course, any desired number of tubes may be connected to the collecting chamber in this way with all of the tubes connected to the collecting chamber at different elevations thereof.

These distributing tubes are respectively connected to the several containers 30 through cover assemblies 26 which are respectively mounted on the containers 30 and which include downwardly directed hollow portions 27 of substantially hemispherical configuration, the flexible tubes 25, 25a, etc. being connected at their ends distant from the chamber 20 to the tubes 28 of the covers 26, these tubes 28 communicating with openings 29 which pass through the walls of the covers 26 at portions of these walls which are spaced from the necks of the containers 30 in the manner shown for the left container 30 in the drawing.

The milk which first flows into the collecting chamber 22 will rise therein until it reaches the top end of the tube 25 and will then flow through the latter into the left container 30 filling the latter before any milk will reach the tube 25a. Of course, there will be some evacuation of the containers 30 as a result of the low pressure within the filter container 20, and any gas which remains in the container 30 will collect in the hollow portion 27 of the cover 26, so that the milk rises in each container 30 until it can no longer compress a gas into the hollow portion 27, whereupon the milk will then flow through the conduit 25 to fill the latter and thus close the container 30 with the milk itself. Now the milk flowing into the collecting chamber 22 will rise above the lowermost conduit 25 to reach the open end of the next higher conduit 25a, and all of the milk now reaching the collecting chamber 22 will fill the next container 30 before reaching the subsequent container 30. If it is estimated that no additional containers 30 are required, then the unused conduits, such as conduit 25b, are closed by the plugs 31, respectively. The covers 26 are removed from the containers 30 in a sequence which is the reverse of the sequence in which they were filled. When each cover is removed the milk in the conduit connected thereto will flow into the can and in addition the milk in the chamber 22 between this conduit and the next higher conduit will flow into the can and the volume of the upper portions of the cans 30 which receive the covers 26 are made large enough so that when the covers are removed additional milk will flow into each container from the conduit connected thereto and from the connecting chamber 22 to an extent which will almost completely fill the container. Of course the operator will be able to estimate how many can or containers 30 are required, and if the operator does not guess correctly, then there is no harm done since any extra containers simply will not receive any milk. The operator will always provide one or two more containers 30 than it is estimated will actually be required. Although only two containers 30 are shown in the drawing, it is to be understood that actually a large number of containers may be provided and the collecting chamber 22 can be made as long as desired so that a large number of tubes may communicate therewith all at different elevations.

Thus, it will be seen that with the above described structure an almost fully automatic operation is achieved and interruptions of the milking process to permit replacing of a filled container with an empty one are eliminated.

It will be understood that each of the elements described above, or two or more together, may also find a useful application in other types of milking apparatus differing from the types described above.

While the invention has been illustrated and described as embodied in automatic milking apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A vacuum-operated milking apparatus adapted to be connected to the udder of a cow and comprising, in combination, a vacuum-container adapted to receive milk therein and having a substantially vertical axis, said vacuum-container including a first chamber of a given diameter and having a lower end, a second chamber of a diameter less than said given diameter and communicating with said lower end of said first chamber, and a collecting chamber communicating with a lower portion of said second chamber; a liquid-permeable filter resting on the bottom wall of said second chamber and extending upwardly therefrom into said first chamber, said filter being coaxial with said first and second chambers and having a diameter less than the diameter of the latter so that milk running into said second chamber will rise in the clearance between the walls of said second chamber and the filter more rapidly than it can flow off through the filter whereby the milk is forced to rise into said first chamber and surround said filter substantially over its entire length thereby utilizing a maximum filter area; and distributing means operatively connected with said collecting chamber, said distributing means including a plurality of conduit means having respective first ends communicating with said collecting chamber on respective vertically spaced horizontal planes, and a plurality of cover means each comprising a peripheral wall portion having an upper end adapted to engage the rim of a container in sealing relationship, said wall portion tapering in the direction away from said upper end and being adapted to be substantially received in said container downwardly of said rim, and a center portion intermediate said wall portion and integral therewith, said center portion being of concavo-convex configuration with the cavity facing the interior of the container, said wall portion being formed with an aperture therethrough downwardly of said upper end and said conduit means having respective second ends each communicating with one of said apertures and thereby with the interior of the container whereby milk, which rises in said collecting chamber to the lowermost horizontal plane on which one of said conduit means communicates with the collecting chamber, will flow through the conduit means and into the container associated with it, thereby forcing a portion of the air in said container to escape therefrom and causing the remainder to become compressed in said cavity until the air-pressure equals the liquid-pressure and the milk rises in said collecting chamber to the next-higher conduit means, this being repeated until each of said containers is filled.

2. In a vacuum-operated milking apparatus adapted to be connected to the udder of a cow, the combination of vacuum container means adapted to receive milk therein and comprising a first chamber of a given diameter and having a lower end, a second chamber of a diameter less than said given diameter and communicating with said first chamber, and a collecting chamber having a substantially vertical axis and communicating with a lower portion of said second chamber; filter means positioned in said second chamber and extending at least partially into said first chamber; and distributing means operatively connected to said collecting chamber, said distributing means including a plurality of conduit means having respective first ends communicating with said collecting chamber on respective vertically spaced horizontal planes for sequentially distributing milk received therefrom to individual ones of a plurality of containers, said conduit means having respective second ends, and said distributing means further including a plurality of cover means adapted to be placed on said containers and each comprising a peripheral wall portion having an upper end adapted to engage the rim of a container and tapering in the direction away from said upper end, said peripheral wall portion being adapted to be substantially received in the respective container, and a center portion intermediate said wall portion and fluid-tightly connected thereto, said center portion being of concavo-convex configuration with the cavity facing the interior of the respective container, and said peripheral wall portion being formed with an aperture therethrough downwardly of said upper end, said second ends of said conduit means communicating with the respective aperture so that, when the cover means is positioned in place on a container, said conduit means communicates with the interior of the container but does not directly communicate with said cavity of the cover means.

3. In a milking apparatus adapted to be connected to the udder of a cow, the combination of container means providing chamber means adapted to receive milk therein; and distributing means operatively connected to said chamber means and including a plurality of conduit means having respective first ends communicating with said chamber means in respective vertically spaced horizontal planes for sequentially distributing milk received therefrom to individual ones of a plurality of containers, said conduit means having respective second ends, and said distributing means further including cover means adapted to be placed on respective ones of said containers and each comprising a peripheral wall portion having an upper end adapted to engage the rim of a container and tapering in the direction away from said upper end, said peripheral wall portion being adapted to be substantially received in the respective container, and a center portion intermediate said wall portion and fluid-tightly connected thereto, said center portion being of concavo-convex configuration with the cavity facing the interior of the container, and said peripheral wall portion being formed with an aperture therethrough downwardly of said upper end, said second ends of said conduit means communicating with the respective apertures so that, when the cover means is positioned in place on a container, said conduit means communicates with the interior of the respective container but does not directly communicate with said cavity of the cover means.

References Cited by the Examiner
UNITED STATES PATENTS 2,509,214  5/1950  Cordis _____ 119—14.09
2,603,396  7/1952  Redin et al. _____ 119—14.09

FOREIGN PATENTS 128,091  6/1948  Australia.

SAMUEL KOREN, *Primary Examiner.*

HUGH R. CHAMBLEE, *Examiner.*